United States Patent
Sakata et al.

(10) Patent No.: US 6,215,258 B1
(45) Date of Patent: Apr. 10, 2001

(54) DYNAMIC FOCUS CIRCUIT SUITABLE FOR USE IN A WIDE-ANGLED CATHODE RAY TUBE

(75) Inventors: Tomohiro Sakata; Mitsuya Masuda, both of Takatsuki; Yukio Uchida, Ibaraki; Tomoaki Iwamoto, Katano, all of (JP)

(73) Assignee: Matsushita Electronics Corporation, Osaka (JP)

( * ) Notice: Subject to any disclaimer, the term of this patent is extended or adjusted under 35 U.S.C. 154(b) by 0 days.

(21) Appl. No.: 09/407,923

(22) Filed: Sep. 29, 1999

(30) Foreign Application Priority Data

Oct. 7, 1998 (JP) .................................. 10-284900
Oct. 22, 1998 (JP) .................................. 10-300565

(51) Int. Cl.[7] ...................................... G09G 1/04
(52) U.S. Cl. ................ 315/382; 315/411; 315/368.18; 313/441
(58) Field of Search ................ 315/382, 1, 5.24, 315/364, 387, 403, 404, 405, 407, 408, 291, 311, 411, 368.18; 313/441

(56) References Cited

U.S. PATENT DOCUMENTS

| | | | | |
|---|---|---|---|---|
| 3,828,239 | * | 8/1974 | Nagai et al. | 315/400 |
| 4,961,031 | * | 10/1990 | Nakagawa et al. | 315/382 |
| 5,614,792 | * | 3/1997 | Ogishima et al. | 315/382.1 |
| 5,705,900 | * | 1/1998 | Hwang | 315/382 |

FOREIGN PATENT DOCUMENTS

| | | |
|---|---|---|
| 821520 | 1/1998 | (EP) . |
| 2-74986 | * 3/1990 | (JP) ............... G09G/1/04 |
| 4117772 | 4/1992 | (JP) . |
| 1042162 | 2/1998 | (JP) . |

OTHER PUBLICATIONS

"Simplified Dynamic Focus Circuit for EA–12/02/99F Lens Gun," by M. Tsukahara et al., ITE (Institute of Image Information and Television), Technical Report, vol. 17, No. 71, pp 19–24, Nov. 18, 1993.

* cited by examiner

Primary Examiner—Don Wong
Assistant Examiner—Trinh Vo Dinh
(74) Attorney, Agent, or Firm—Price and Gess

(57) ABSTRACT

A dynamic focus circuit enables ideal focusing characteristics to be obtained across the entire screen of a wide-angled cathode ray tube, by generating a dynamic focus voltage having a flat-bottomed waveform through the addition of a simple circuit to a conventional analog circuit. If an S-shaping voltage method is used, the voltage of a signal induced in a secondary coil of a step-up transformer for raising the voltage of a parabolic waveform signal having a horizontal deflection period switches the gain for converting the parabolic waveform signal to a dynamic focus voltage, according to whether the induced voltage exceeds a specified reference value. If the induced voltage does not exceed the specified reference value, the parabolic waveform signal is converted to the dynamic focus voltage at a gain of less than one. If a DAF (Dynamic Focus) signal generating IC is used, a gain control voltage for controlling a gain of the parabolic waveform signal generated by the DAF signal generating IC is altered so that the gain is smaller than one at the approximate midpoint of a horizontal deflection period, and increases as it moves out to the edges of the screen.

14 Claims, 14 Drawing Sheets

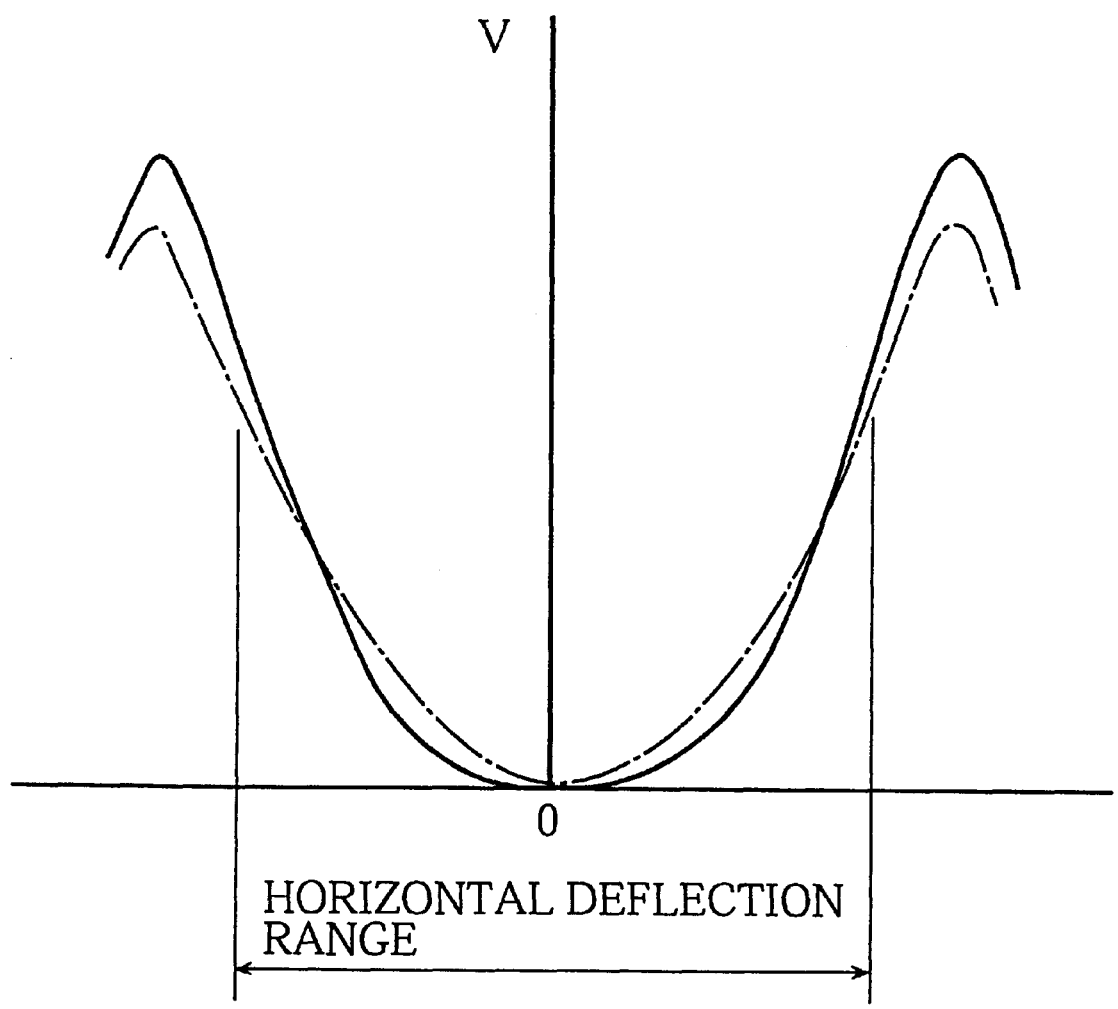

8.25V_{P-P}

12V_{P-P}

8.25V_{P-P}

440V_{P-P}

HORIZONTAL PERIOD

DYNAMIC FOCUS CIRCUIT SUITABLE FOR USE IN A WIDE-ANGLED CATHODE RAY TUBE

This application is based on applications Nos. 10-284900 and 10-300565 filed in Japan, the contents of which are hereby incorporated by reference.

BACKGROUND OF THE INVENTION

1. Field of the Invention

The present invention relates to a dynamic focus circuit generating a dynamic focus voltage, suitable for use in a wide-angled cathode ray tube (referred to as a CRT hereafter).

2. Description of the Related Art

In a CRT, a direct current (DC) voltage is typically applied as a focus voltage to a focus electrode in an electron gun. This DC voltage is produced by dividing the anode voltage to give a voltage with one quarter to one third times the magnitude. However, the distance the CRT electron beam travels to reach a screen varies between the center and the edges of the screen, so that obtaining satisfactory focus across the whole screen by applying only the DC voltage to the focus electrode is impossible. The amount of voltage applied to the focus electrode needs to be determined according to the distance between the focus electrode and a phosphor surface of the screen, that is according to the screen position at which the electron beam is focused. In a conventional CRT, voltage variations are commonly expressed by parabolic waveforms having horizontal and vertical periods. These waveforms are hereafter referred to as the horizontal and vertical parabolic waveforms. The voltage expressed by these parabolic waveforms is combined with the DC voltage and the resulting voltage is applied to the focus electrode. A circuit for generating modified horizontal and vertical parabolic waveforms so that the appropriate focus voltage can be applied to the focus electrode is known as a dynamic focus circuit.

One example of a dynamic focus circuit in the related art is given in Japanese Laid-Open Patent 4-117772 and *Television Gakkai Gijyutsu Hokoku* (*The Television Society's Technical Report*) Vol 17, No. 71, P 19 to 24 (published Nov. 18, 1993). The dynamic focus circuit disclosed here uses a method in which the voltage of a parabolic waveform signal generated at both ends of an S-shaping capacitor in a horizontal deflection circuit is raised directly using a step-up transformer. This method is hereafter referred to as the 'S-shaping voltage method'. The following is an explanation of a related art example, a dynamic focus circuit using this S-shaping voltage method, with reference to the drawings.

FIG. 1 shows an example of a horizontal deflection circuit, and a related art dynamic focus circuit, which have been integrated to form one circuit.

The horizontal deflection circuit shown in the drawing includes a horizontal output transistor 901, into the base of which a horizontal drive signal is input, a damper diode 902, a resonance capacitor 903, a choke coil 904, a horizontal deflection coil 905, a S-shaping capacitor 906, and an alternating current (AC) coupling capacitor 909. The dynamic focus circuit is structured so that a dynamic focus voltage can be obtained by raising the voltage of a parabolic waveform signal generated at both ends of the S-shaping capacitor 906 using a step-up transformer 908.

The horizontal output transistor 901, the damper diode 902 and the resonance capacitor 903 are connected in parallel, and the collector side of the horizontal output transistor 901 is connected to a +B power source through the choke coil 904. The collector side of the horizontal output transistor 901 is also connected to one terminal of the horizontal deflection coil 905. The other terminal of the horizontal deflection coil 905 is connected to the S-shaping capacitor 906.

One terminal of the primary coil of the step-up transformer 908 is connected to a node 907, where the horizontal deflection coil 905 and the upper end of the S-shaping capacitor 906 connect. The AC coupling capacitor 909 is connected to the other terminal of the primary coil of the step-up transformer 908.

In the dynamic focus circuit, a vertical dynamic focus voltage waveform generating circuit 912 (hereafter referred to as the vertical voltage waveform generating circuit 912) and a capacitor 914 are connected to one terminal of the secondary coil of the step-up transformer 908. The other terminal is coupled to a DC focus voltage generating circuit 913 through a resistor 910 and an AC coupling capacitor 911. The dynamic focus circuit is structured so as to be connected to the focus electrode in the electron gun.

FIG. 2 shows waveforms produced in various parts of the above dynamic focus circuit. Horizontal collector pulses 921 are generated at the collector side of the horizontal output transistor 901 by the resonance of the horizontal deflection coil 905, the choke coil 904 and the resonance capacitor 903. A secondary integration operation of the horizontal deflection coil 905 and the S-shaping capacitor 906 generates a horizontal parabolic voltage 922 in the S-shaping capacitor 906. When the horizontal parabolic voltage 922 is applied to the primary coil of the step-up transformer 908, a dynamic focus voltage 923 for a horizontal deflection period is output from the secondary coil of the step-up transformer 908.

A vertical dynamic focus voltage generated by the vertical voltage waveform generating circuit 912 is added to the horizontal dynamic focus voltage by being input into the other terminal of the secondary coil of the step-up transformer 908. The dynamic focus voltage obtained is passed through the resistor 910 and the AC coupling capacitor 911 and combined with a DC voltage obtained from the DC focus voltage generating circuit 913. The resulting voltage is then supplied to the focus electrode in the electron gun, enabling an ideal focus to be obtained across the entire screen.

As explained above, the related art dynamic focus circuit uses the S-shaping voltage method to obtain a dynamic focus voltage waveform by raising the voltage of a parabolic waveform signal generated at both ends of an S-shaping capacitor in a horizontal deflection circuit using a step-up transformer.

In recent years, however, CRTs with a wider deflection angle and less depth (hereafter referred to as wide-angled CRTs) are increasingly being used to enable space-saving display devices with large screens to be produced. When compared with a conventional device, a wide-angled CRT experiences a sharp increase in distortion between the plane at which the electron beam is focused and the surface of the phosphor layer as the electron beam moves towards the edges of the screen, if a uniform focus voltage is used. Accordingly, when a related art parabolic waveform proportional to the square of the distance from the center of the screen is used as the horizontal focus voltage waveform, obtaining satisfactory focus across the entire screen is problematic.

The results of our investigation into the focus characteristics of a wide-angled CRT, in light of the above problems, are shown in FIG. 3. In the drawing, a dashed line (curve a) represents a quadratic curve of a dynamic focus voltage in the related art. A solid line (curve b) represents the dynamic focus voltage suitable for a wide-angled CRT. Curve a is proportional to the square of the distance from the center of the screen. Curve b is obtained by making a mirror image of a curve proportional to the distance from the center of the screen raised to the power of around 2.5 for the right half of the screen. This produces a curve in which the left and right halves are symmetrical. In a wide-angled CRT, the distortion between the plane at which the electron beam is focused and the surface of the phosphor layer increases sharply as the electron beam moves from the center to the edges of the screen, as shown here. As a result, a dynamic focus voltage having a waveform that is flatter than the related art in the center of the screen, and rises more steeply towards the edges of the screen (this waveform is hereafter referred to as 'the flat-bottomed waveform') is required to obtain satisfactory focus characteristics across the entire screen. As shown in FIG. 3, there is a large voltage difference between the two curves at either edge of the screen and in an area from 60 to 140 mm on either side of the center of the screen, so that applying a dynamic focus voltage with a conventional parabolic waveform in a wide-angled CRT leads to a deterioration in focus in these areas of the screen.

One possible approach to resolving this problem is suggested in Japanese Laid Open Patent No. 10-42162. Here, this document describes a dynamic focus circuit shown in FIG. 4, including a ROM 931 for storing function data, a counter 932 initialized by a synchronizing signal S, a RAM 933 for storing waveform data, and a CPU 934 for performing calculations. The CPU 934 uses function data already stored in the ROM 931 to perform computation of waveform data depending on screen positions, and stores the results in the RAM 933. Next, the waveform data is read from the RAM 933 and output to a D/A converter 935, which converts it from digital to analog data, and outputs a dynamic focus voltage waveform. In other words, in the above related art dynamic focus circuit, digital processing is used to generate a waveform expressed by a complex function.

Digitalization of circuitry in display devices using CRTs has become more common in recent years, but a method for generating a digitalized dynamic focus signal cannot easily be introduced due to cost constraints, and so analog circuits are still generally preferred. Even the dynamic focus circuits used in high-definition computer monitors are mainly analog.

SUMMARY OF THE INVENTION

The object of the present invention is to provide a dynamic focus circuit that can obtain ideal focus characteristics across the whole screen of a wide-angled CRT device by generating a flat-bottomed waveform using an analog method.

The above object is achieved by a dynamic focus circuit with the following characteristics. The dynamic focus circuit obtains a dynamic focus signal from a parabolic waveform signal having a horizontal deflection period generated at both ends of an S-shaping capacitor. The dynamic focus signal is supplied to an electron gun in a cathode ray tube to focus an electron beam. The dynamic focus circuit includes a transformer and first and second converting units. The transformer has a primary coil and a secondary coil, and the parabolic waveform signal is applied to the primary coil. The first converting unit converts a signal induced in the secondary coil of the transformer to a dynamic focus signal at a gain of less than one during a first part of a horizontal deflection period. The first part of the horizontal deflection period is when the voltage of the signal induced in the secondary coil does not exceed a specified reference value. The second converting unit converts the signal induced in the secondary coil of the transformer to a dynamic focus signal at a gain greater than the gain of the first converting unit during a remainder of the horizontal deflection period. The remainder of the horizontal deflection period is when the voltage of signal induced in the secondary coil is not less than the specified reference value.

Suppose that an S-shaping voltage method is used with this structure. When a parabolic waveform signal is converted to a dynamic focus voltage signal after having its voltage raised using a step-up transformer, the gain when conversion is performed is switched according to whether the value for the parabolic waveform signal has exceeded a specific reference value. This transforms the parabolic waveform signal, creating a flat-bottomed waveform. Accordingly, the flat-bottomed waveform can be obtained by the addition of a simple circuit to the analog circuit in the related art.

The above object is also achieved by a dynamic focus circuit with the following characteristics. The dynamic focus circuit obtains a dynamic focus signal from a pulse signal having a horizontal deflection period. The dynamic focus signal is supplied to an electron gun in a cathode ray tube to focus an electron beam. The dynamic focus circuit includes a parabolic waveform generating integrated circuit (IC), and a control voltage generating circuit. The parabolic waveform generating integrated circuit (IC) includes a first circuit part that generates a parabolic waveform signal having a horizontal deflection period from the pulse signal, and a second circuit part that amplifies the parabolic waveform signal. In addition, the parabolic waveform generating IC is provided with a receiving part that receives a control voltage for controlling a gain of the second circuit part. The control voltage generating circuit outputs the control voltage to the receiving part. The control voltage then changes the gain so that the gain is less than one in a central part of the horizontal deflection period, and not less than one in the parts of the horizontal deflection period excluding the central part.

Another related art method for obtaining the dynamic focus waveform uses an integrated circuit (IC) used exclusively for dynamic focusing (hereafter referred to as a 'DAF (Dynamic Focus) signal generating IC'). In the above structure, a parabolic waveform signal generated by the DAF signal generating IC is amplified and output. When this happens, the flat-bottomed waveform is obtained by successively increasing the gain while moving from the center to the edges of the horizontal deflection period. Accordingly, the flat-bottomed waveform can be obtained by the addition of a simple circuit to the analog circuit in the related art.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 8 shows the values of the parabolic waveform signal input in the nonlinear circuit 127 and the waveform for the output dynamic focus voltage in the embodiments of the present invention;

DESCRIPTION OF THE PREFERRED EMBODIMENTS

The following is a description of the embodiments of the present invention, with reference to the drawings.

First Embodiment

Figure 5:
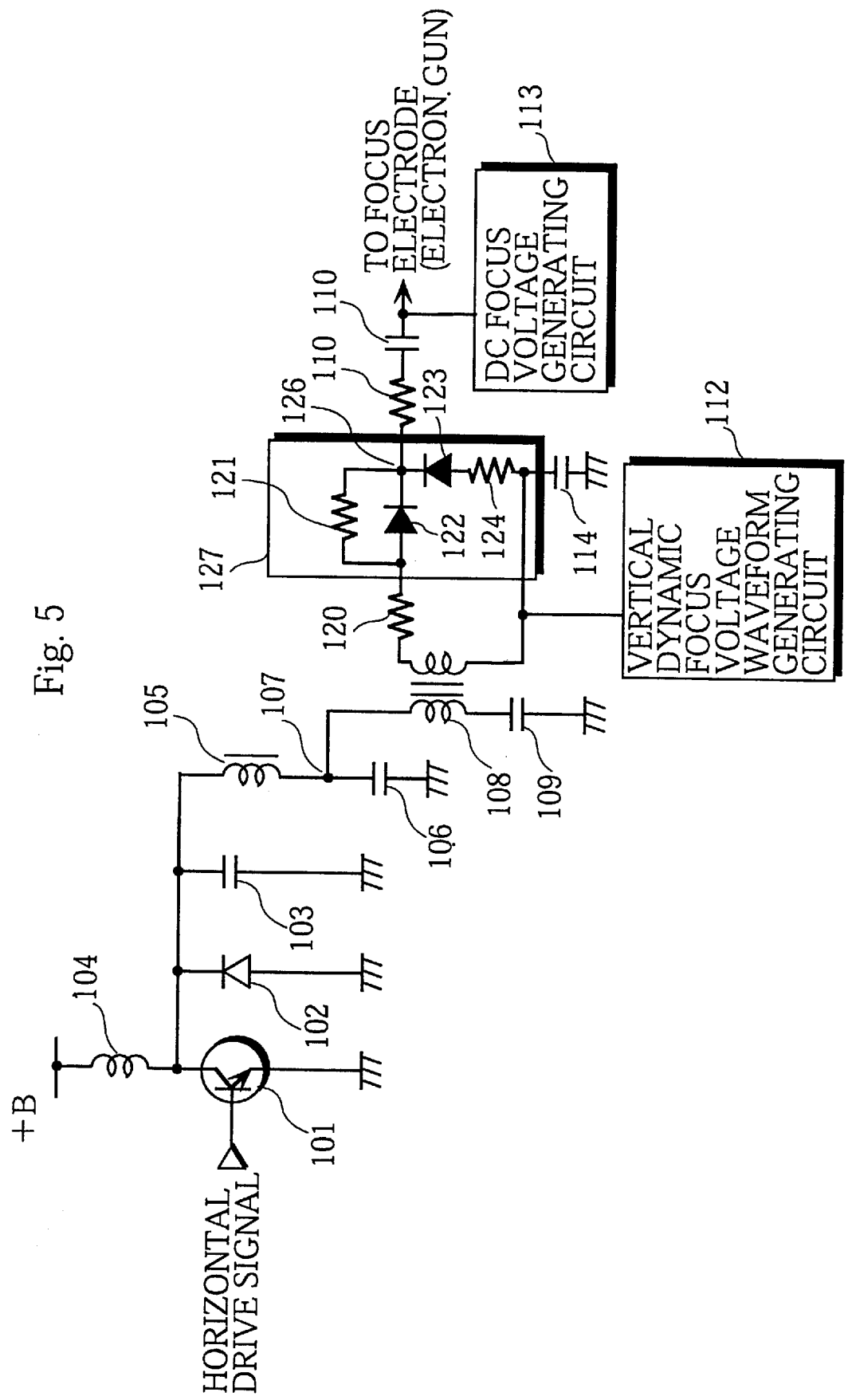
FIG. 5 shows an example of an integrated circuit composed of the dynamic focus circuit of the first embodiment, and a horizontal deflection circuit.

FIG. 5 shows an example of an integrated circuit composed of a dynamic focus circuit in the first embodiment of the invention, and a horizontal deflection circuit. Note that the part of the circuit formed by the horizontal deflection circuit, that is the part to the left of the transformer 108 in the drawing, is identical to the circuit in the related ID art. As a result, detailed explanation of this part of the circuit is omitted.

In the dynamic focus circuit of the present embodiment, a resistor 121 and a diode 122 are connected in parallel through a resistor 120 to one terminal of the secondary coil of a step-up transformer 108. The other terminal of the secondary coil is connected to ground through a capacitor 114, as well as being connected to a vertical dynamic focus voltage waveform generating circuit 112. A diode 123 is connected to a node through a resistor 124. The capacitor 114 and the secondary coil of the step-up transformer 108 are connected at this node. The other terminal of the diode 123 is connected to a node 126, at which the resistor 121 and the diode 122 are connected. A dynamic focus voltage obtained at the node 126 is input into a resistor 110, connected to a DC voltage generating circuit 113 through an AC coupling capacitor 111, and connected to a focus electrode in an electron gun.

The dynamic focus circuit in the present embodiment differs from the related art in that a nonlinear circuit 127, composed of the resistor 121, the diodes 122 and 123, and the resistor 124 has been added.

Figure 1:
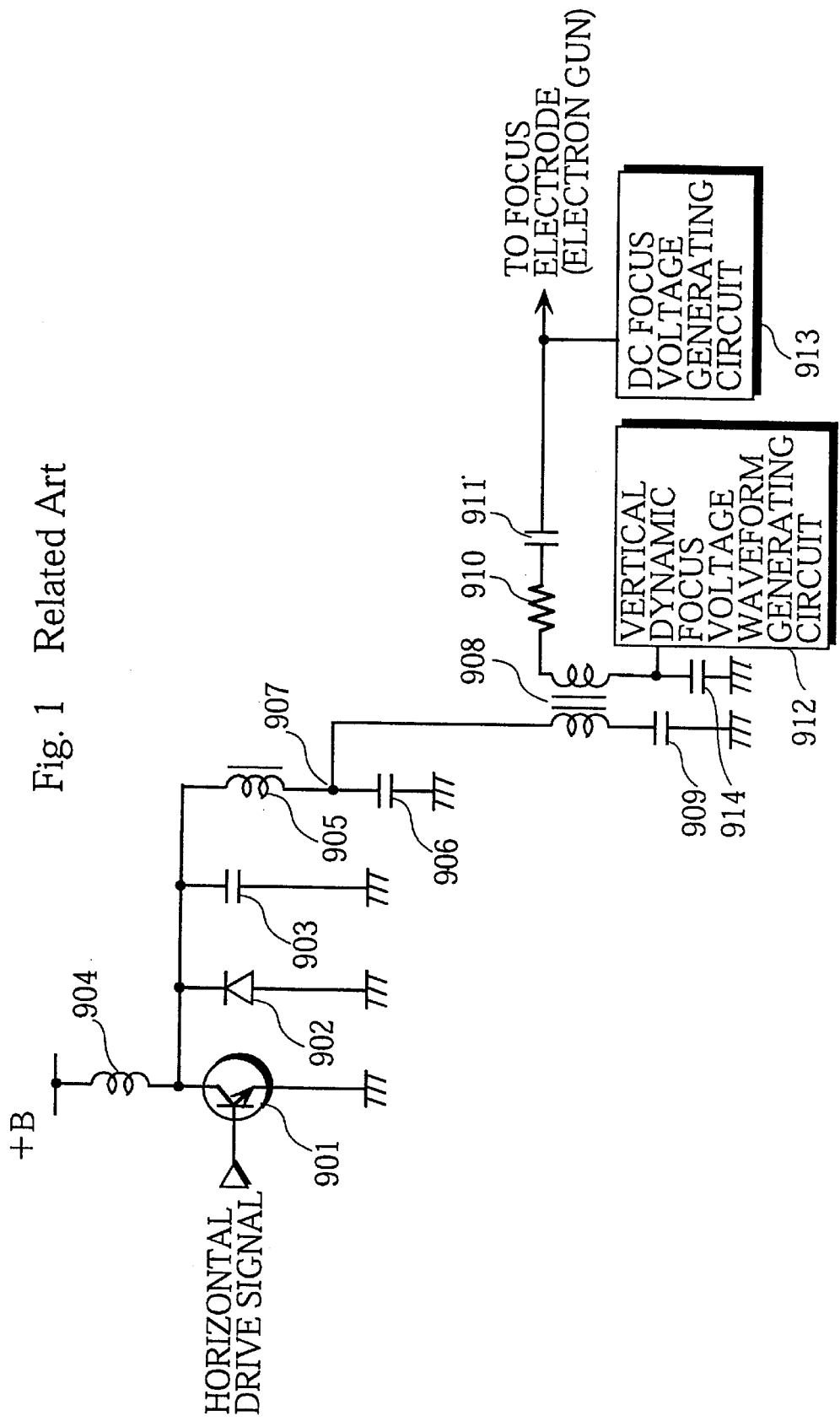
FIG. 1 shows an example of a unified circuit composed of a horizontal deflection circuit, and a dynamic focus circuit in the related art using a S-shaping voltage method.
Figure 2:
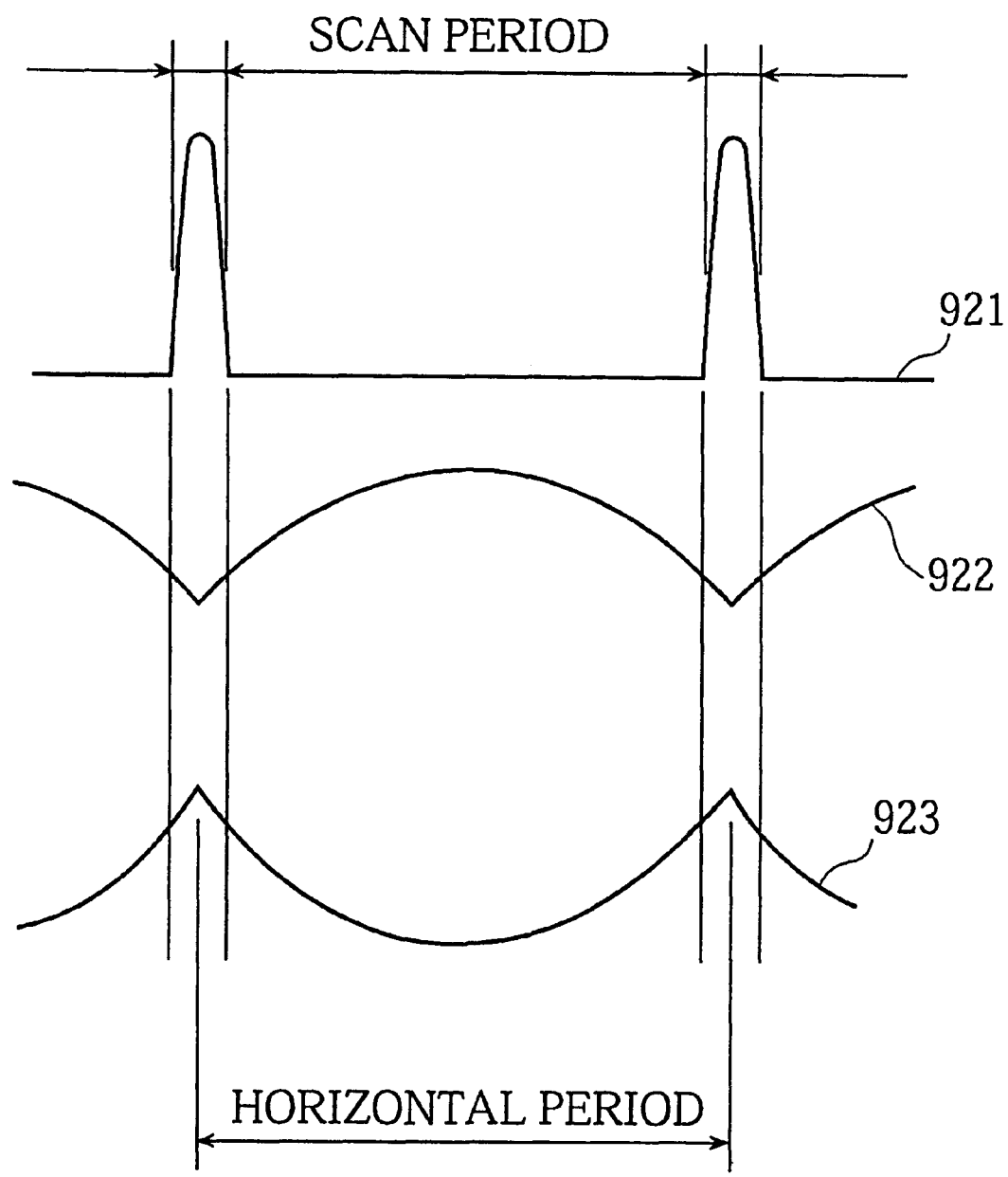
FIG. 2 shows waveforms produced at various parts of the circuit shown in FIG. 1.
Figure 3:
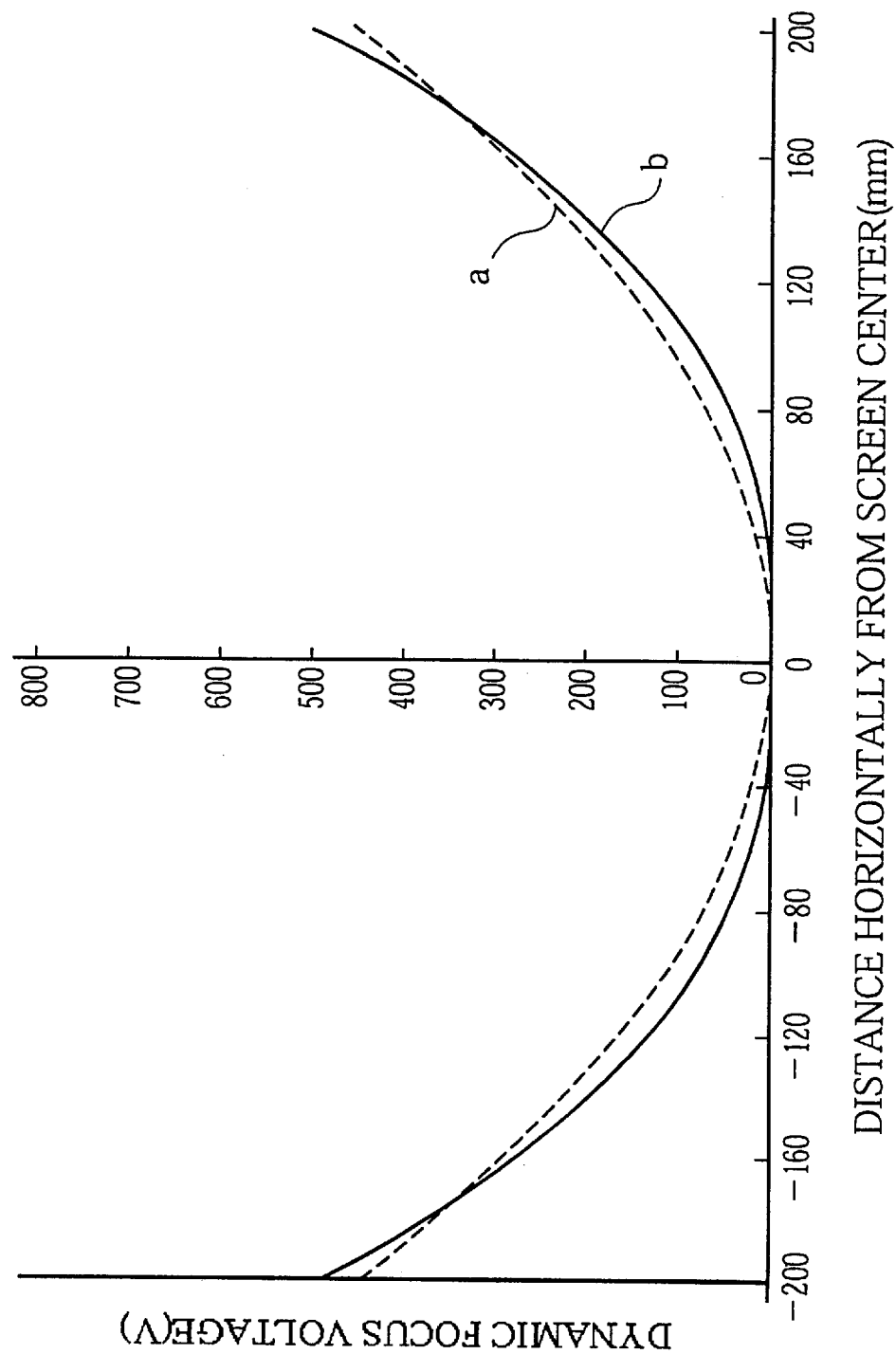
FIG. 3 shows the results of an experiment investigating the focus characteristics of a wide-angled CRT.
Figure 4:
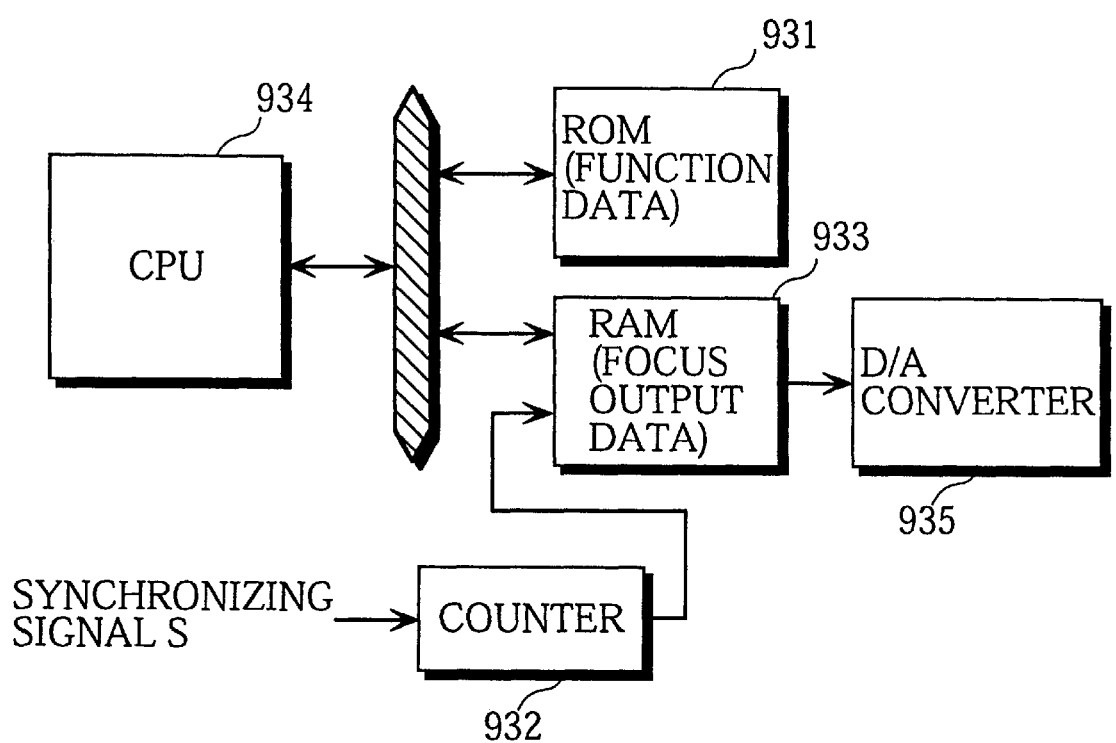
FIG. 4 shows a structure for a related art dynamic focus circuit using digital processing.

The following is an explanation of the operation of the dynamic focus circuit in the present embodiment. A voltage expressed by a parabolic waveform signal having a horizontal period (hereafter referred to as the horizontal parabolic waveform signal) is applied to the primary coil of the step-up transformer 108. The voltage of the horizontal parabolic waveform signal is raised before it is output from the secondary coil of the step-up transformer 108. These processes use the related art technology described using FIG. 2, so further explanation is omitted. Here the horizontal period is equivalent to one horizontal scan of the screen by the electron beam. The following explanation concentrates on the operation of the nonlinear circuit 127 connected to the secondary coil of the step-up transformer 108, which is constructed from the resistors 121 and 124 and the diodes 122 and 123.

Figure 6A:
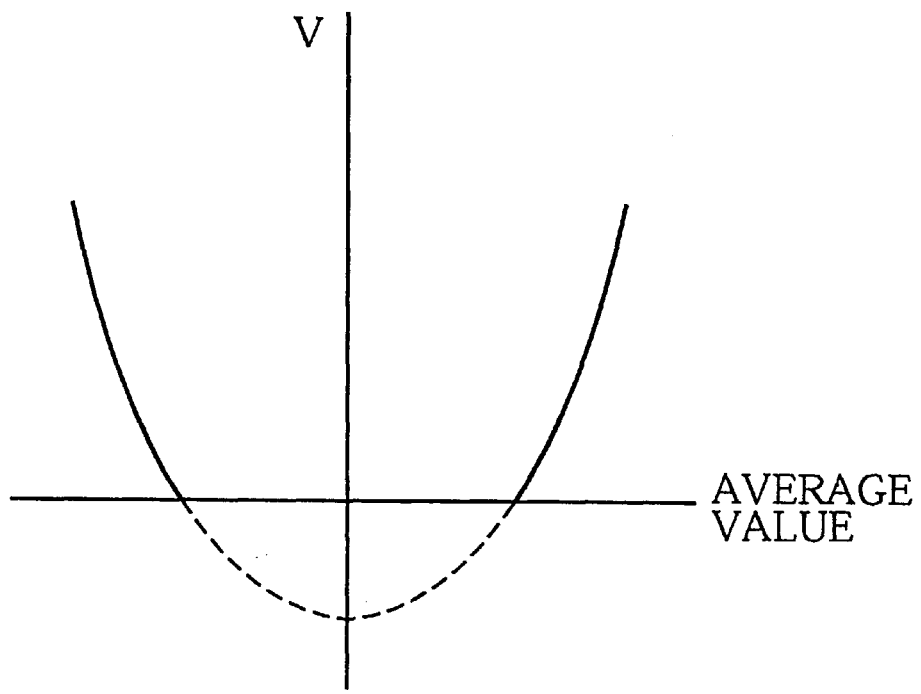
FIG. 6 illustrates the operation of a nonlinear circuit 127 when the value of the parabolic waveform signal is no less than the average value for the same.
Figure 6B:
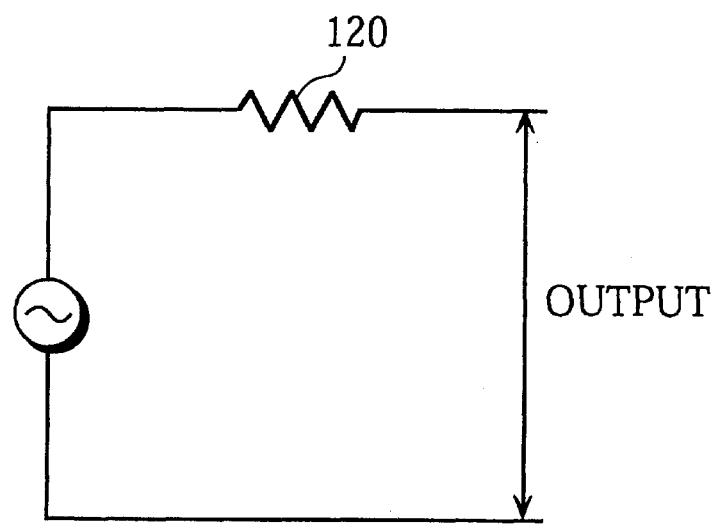

As illustrated in FIG. 6A, when a voltage expressed by a parabolic waveform signal input into the nonlinear circuit 127 is no less than an average value (the part of the curve shown by the solid lines in the drawing) the diode 122 is ON and diode 123 OFF. The average value obtained is an average value c obtained from an integral average value theorem $f(c)=1/(b-a)\int f(x)dx$, Accordingly, the nonlinear circuit 127 operates as the circuit shown in 6B and the parabolic waveform signal is output without alteration.

Figure 7A:
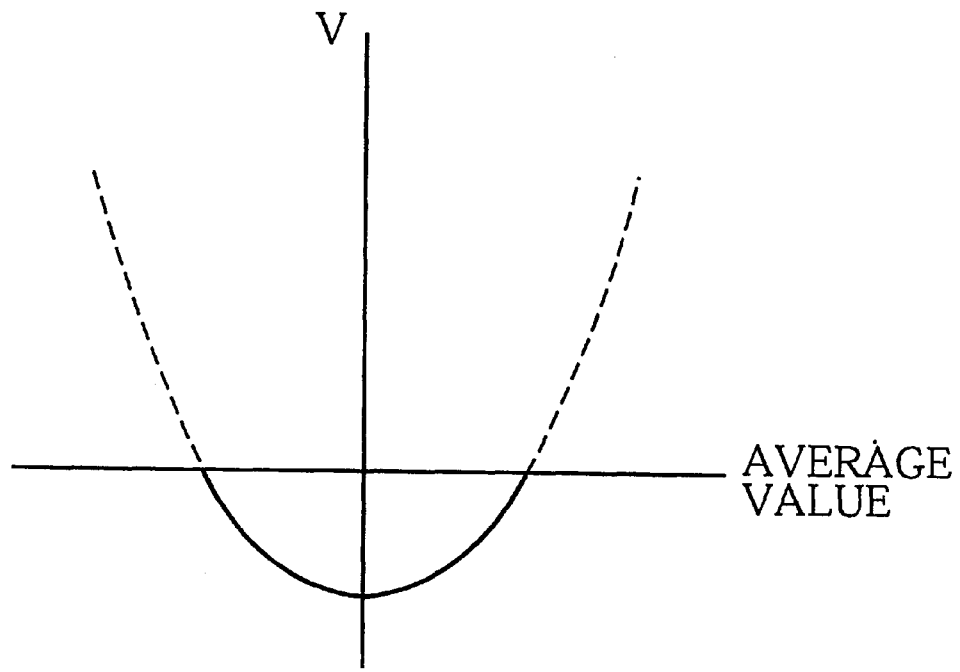
FIG. 7 illustrates the operation of the nonlinear circuit 127 when the value of the parabolic waveform signal is lower than the average value for the same.
Figure 7B:
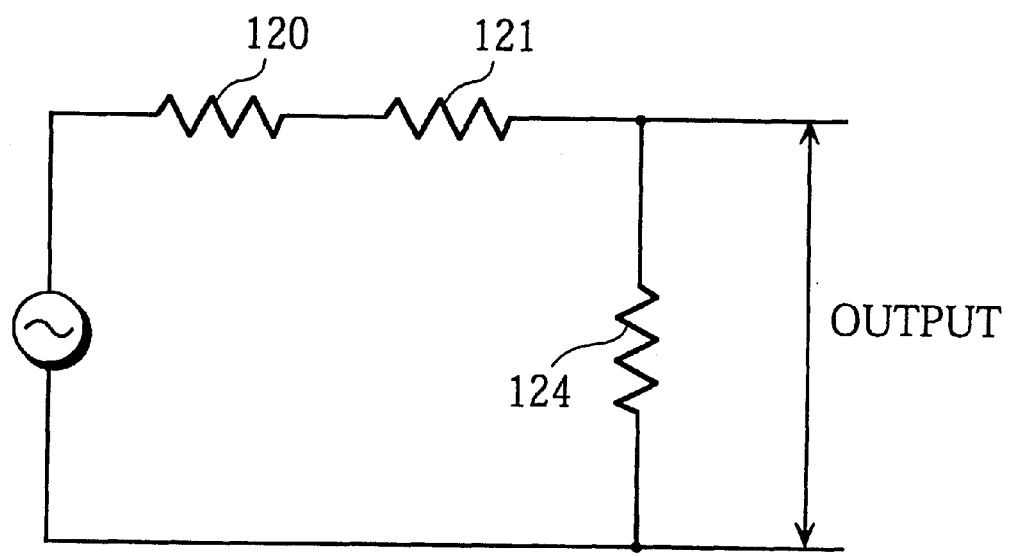

When, on the other hand, the voltage expressed by the parabolic waveform signal is less than the average value, as shown by the part of the curve drawn with a solid line in FIG. 7A, the diode 122 is OFF and the diode 123 ON. The nonlinear circuit 127 operates as the circuit shown in FIG. 7B, and a parabolic waveform signal whose level is set by the gain determined by the voltage division ratio of the resistors 120, 121 and 124.

By using the average value of the voltage expressed by the horizontal parabolic waveform signal as a reference, and switching the gain of the nonlinear circuit 127 when the value is at least as great as the average value and when the value is less than the average value, a flat-bottomed curve with a flatter central part than the dynamic focus voltage expressed by the quadratic curve in the related art can be generated. Ideal focus characteristics can thus be obtained across the entire screen.

Here, actual examples of resistance values and the like occurring in the dynamic focus circuit shown in FIG. 5 are given as one way of realizing the first embodiment. In this example, the resistor 120 has a resistance of 1.2kΩ (¼W), the resistor 121 of 33kΩ (2W), resistor 124 of 49kΩ (½W) and resistor 110 of 1kΩ (½W). An RU1C diode (1000V/0.2A) manufactured by Sanken Electric Co., Ltd. is used for the diodes 122 and 123. The capacitor 114 has a capacitance of 220 pF (1kV).

In the above example, since the resistances of the resistors 120, 121 and 124 are 1.2kΩ, 33kΩ and 49kΩ respectively, the gain of the nonlinear circuit 127 when the dynamic focus voltage is less than the average value is 49/(1.2+33+49), that is 0.59.

The following is an explanation of the gain adjustment method. Taking the center point of the screen as the origin, points are determined along the horizontal axis so as to divide the right half (or the left half) of the screen into four parts. If a 19-inch CRT is used, these points will be 45 mm, 90 mm, 135 mm and 180 mm from the center of the screen. The focus voltage is then adjusted so that the R, G and B focuses are ideal at each of these four points, in other words so that the spot formed by the electron beam is as small as possible. The relation between the focus voltage and screen position at these points is plotted on a graph, and an approximation curve is found. The approximation curve obtained in this way establishes the values of the dynamic focus voltage signal to be output by the nonlinear circuit 127. The input voltage expressed by the parabolic waveform signal generated by the secondary coil of the step-up transformer 108 may be suitably adjusted via the resistance values of the resistors 121 and 124 and the like to produce the dynamic focus voltage expressed by the approximation curve.

FIG. 8 shows a waveform for the values of the parabolic waveform signal input into the nonlinear circuit 127 (the curve represented by a dashed line), and a waveform for the dynamic focus voltage output to the focus electrode in the electron gun (the curve represented by a solid line) in the above embodiment. It can be seen that a dynamic focus voltage with a flat-bottomed waveform is output in the horizontal deflection range, rather than the quadratic curve of the related art. The dynamic focus voltage obtained by the dynamic focus circuit in the present example has a curve proportional to the distance from the center of the screen raised for to a power of around 2.5 for the right half of the screen. A mirror image of this curve forms the curve for the left half of the screen.

As explained above, if the dynamic focus circuit of the present embodiment is used in a wide-angled CRT, a dynamic focus voltage waveform with a flat-bottomed shape can be generated by the addition of a simple and low-cost circuit to the related art analog circuit. This enables ideal focus characteristics to be realized across the entire screen.

In the nonlinear circuit 127 of the present embodiment, diodes were used to switch the gain between that when a voltage value at least as great as the average value and that when a voltage value is less than the average value, but other components such as transistors and thyristors may be used, provided that they have a switching capability. At present, such substitute components are slightly more expensive than diodes and transistors, but this may change in the future. Other components which possess impedance towards an AC power source may be used instead of the resistors. The use of components such as coils may be considered, although this may require research into the conditions necessary to avoid the generation of undesirable resonance.

The dynamic focus circuit in the present embodiment may be adapted to vertical deflection as well as horizontal deflection.

Second Embodiment

The following is an explanation of the second embodiment of the present invention. This embodiment describes a method for obtaining a flat-bottomed waveform using a DAF (Dynamic Focus) signal generating IC method.

Figure 9:
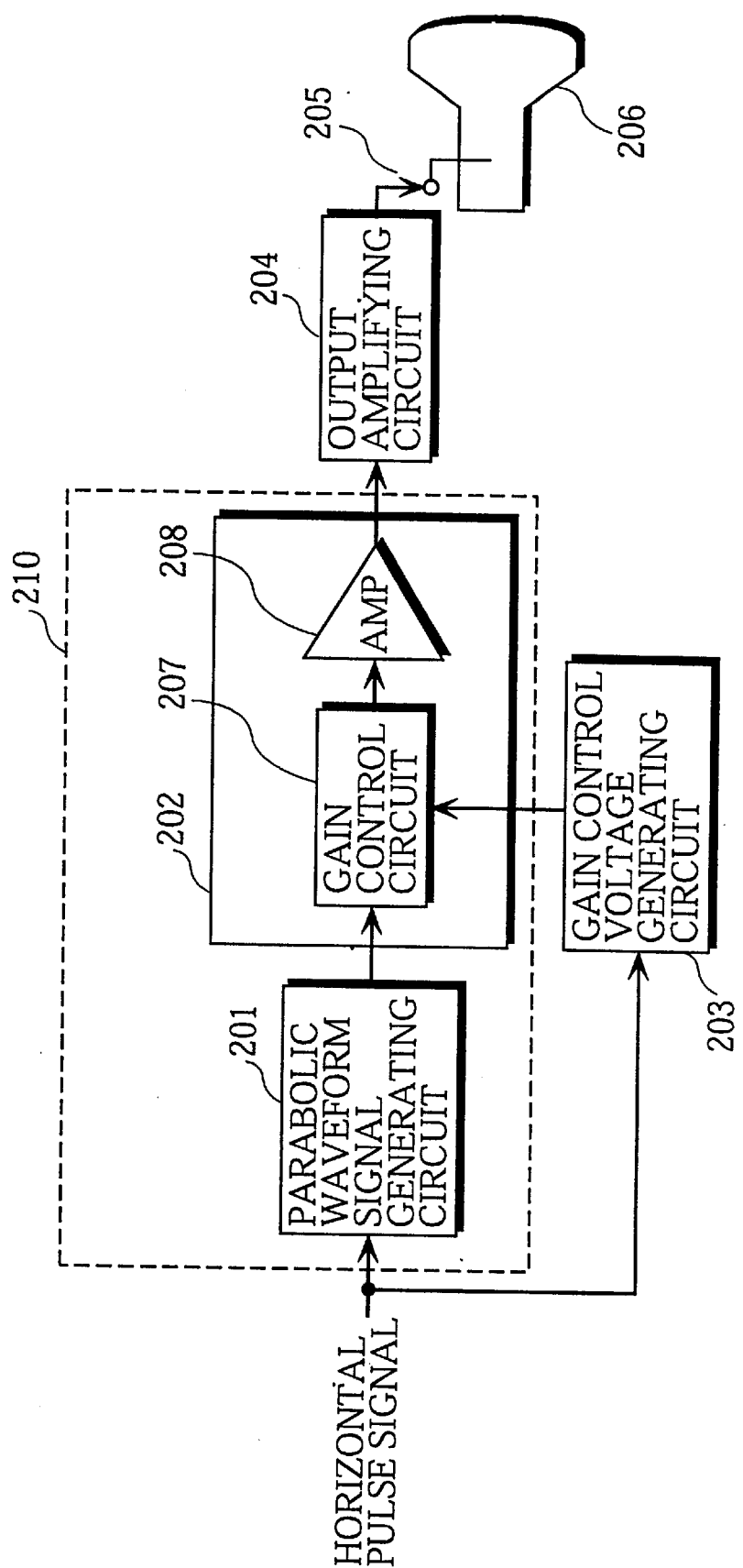
FIG. 9 is a block diagram showing a structure of the dynamic focus circuit in the second embodiment of the invention.

FIG. 9 is a block diagram showing a structure for a dynamic focus circuit in the present embodiment. The dynamic focus circuit of the present embodiment uses a DAF signal generating IC 210, and includes a parabolic waveform signal generating circuit 201, a gain control unit 202 for controlling a gain for the parabolic waveform signal, a gain control voltage generating circuit 203 for generating a gain control voltage used to control the gain control unit 202, and an output amplifying circuit 204 for amplifying the output voltage from the gain control unit 202 to generate a dynamic focus voltage. The DAF signal generating IC 210 in the present embodiment is composed from the parabolic waveform signal generating circuit 201 and the gain control unit 202, as shown in the drawing. The gain control unit 202 includes a gain control circuit 207 and an amplifier 208.

The following is an explanation of the operation of the dynamic focus circuit in the present embodiment. The parabolic waveform signal generating circuit 201 receives a horizontal pulse signal input and generates a horizontal parabolic waveform signal, which is then input into the gain control circuit 207 in the gain control unit 202. The gain control circuit 207 successively changes the gain of the parabolic waveform signal according to the voltage values expressed by the parabolic waveform signal, using the gain control voltage generated by the gain control voltage generating circuit 203. This changes the parabolic wave to a shape having a non-parabolic wave. In the present embodiment, the gain control voltage generated by the gain control voltage generating circuit 203 is not uniform, but changes in response to the voltage values expressed by a parabolic waveform signal, that is in response to screen positions along a horizontal axis. The gain control unit 202 changes the parabolic wave to a specified waveform by multiplying the gain control voltage and the parabolic waveform signal together. This means that if the gain is increased by the gain control circuit 207 as the gain control voltage rises, a situation where the gain control voltage is set at a low level in the central part of the screen and raised continuously moving towards either edge of the screen may be envisaged. However, if the gain control voltage is already formed so that it rises as it moves towards the edges of the screen, there is no need to alter it continuously. Depending on the shape of the CRT, this pulse signal can be set, for example, at LOW in the center of the screen and HIGH at the edges of the screen.

A circuit for outputting a gain control voltage as described above, such as a function generating circuit or similar, may be used as the gain control voltage circuit 203. The gain control voltage is output synchronized with the horizontal pulse signal. The DAF signal generating IC 210 in the present embodiment is provided with a pin for receiving the input gain control voltage. The dynamic focus circuit of the present embodiment is realized by guiding the output from the gain control voltage generating circuit 203 to the input pin for the gain control voltage.

The output voltage from the gain control circuit 207 is input into the output amplifying unit 204 via the amplifier 208. The voltage is amplified to a specified voltage in the output amplifying unit 204, forming the dynamic focus voltage. The dynamic focus voltage is supplied to a focus electrode 205 in the electron gun of a CRT 206.

Figure 10:
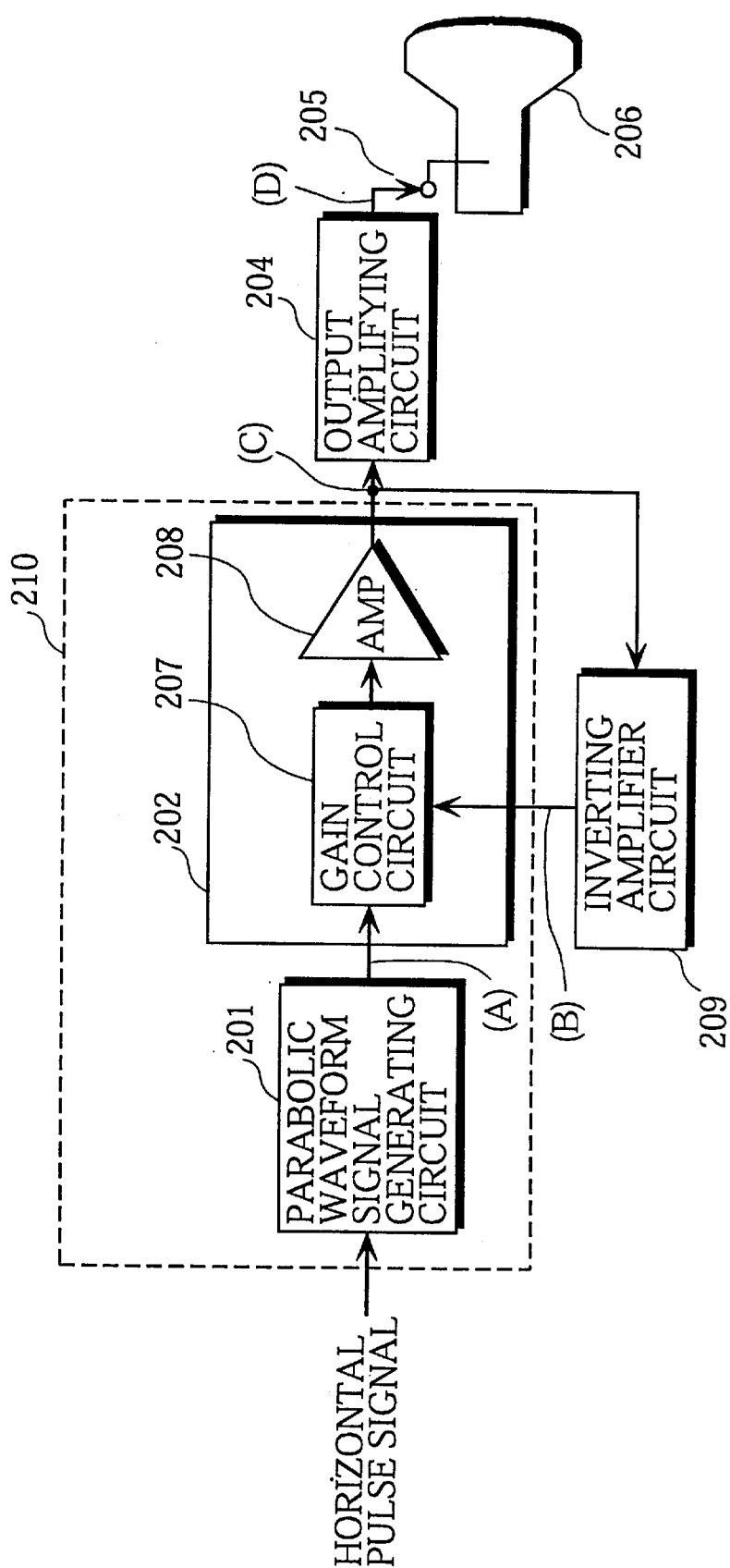
FIG. 10 shows another example structure for the dynamic focus circuit in the second embodiment.

FIG. 10 shows an example of another structure for the dynamic focus circuit in the present embodiment. In this example, the gain control voltage generating circuit is formed from an inverting amplifier circuit 209, and the output voltage from an amplifier 208 is fed back into the gain control circuit 207 via the inverting amplifier circuit 209. An example of an actual circuit with this structure will be explained later in this specification. In the example structure shown in the drawing, the DAF signal generating IC 210 inverts and outputs the parabolic waveform generated by the parabolic waveform generating circuit 201. As a result, the inverting amplifier circuit 209 is used to obtain positive feedback. However, if the DAF signal generating IC 210 does not invert the output, there is no need to use an inverting amplifier circuit and a regular amplifying circuit may be used. This is because the gain control voltage rises continuously as it moves from the center to the edges of the screen in either case. Note that the integral power of the flat-bottomed waveform may be regulated by adjusting the gain of the inverting amplifier circuit 209.

Figure 11:
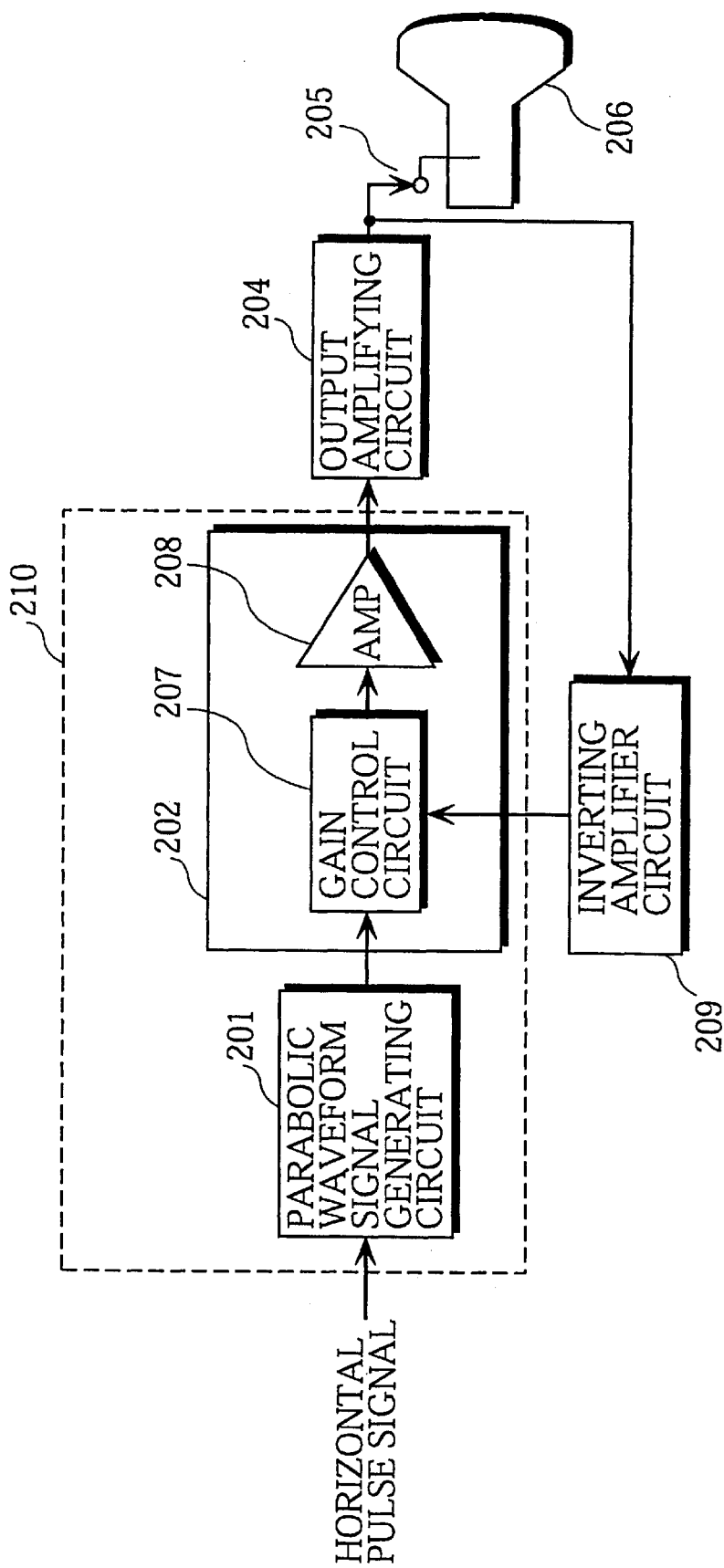
FIG. 11 shows another example structure for the dynamic focus circuit in the second embodiment.

An alternative structure in which a dynamic focus voltage obtained from the output amplifying unit 204 is input into the inverting amplifier circuit 209 and fed back to the gain control circuit 207, as shown in FIG. 11, may also be used.

Figure 12:
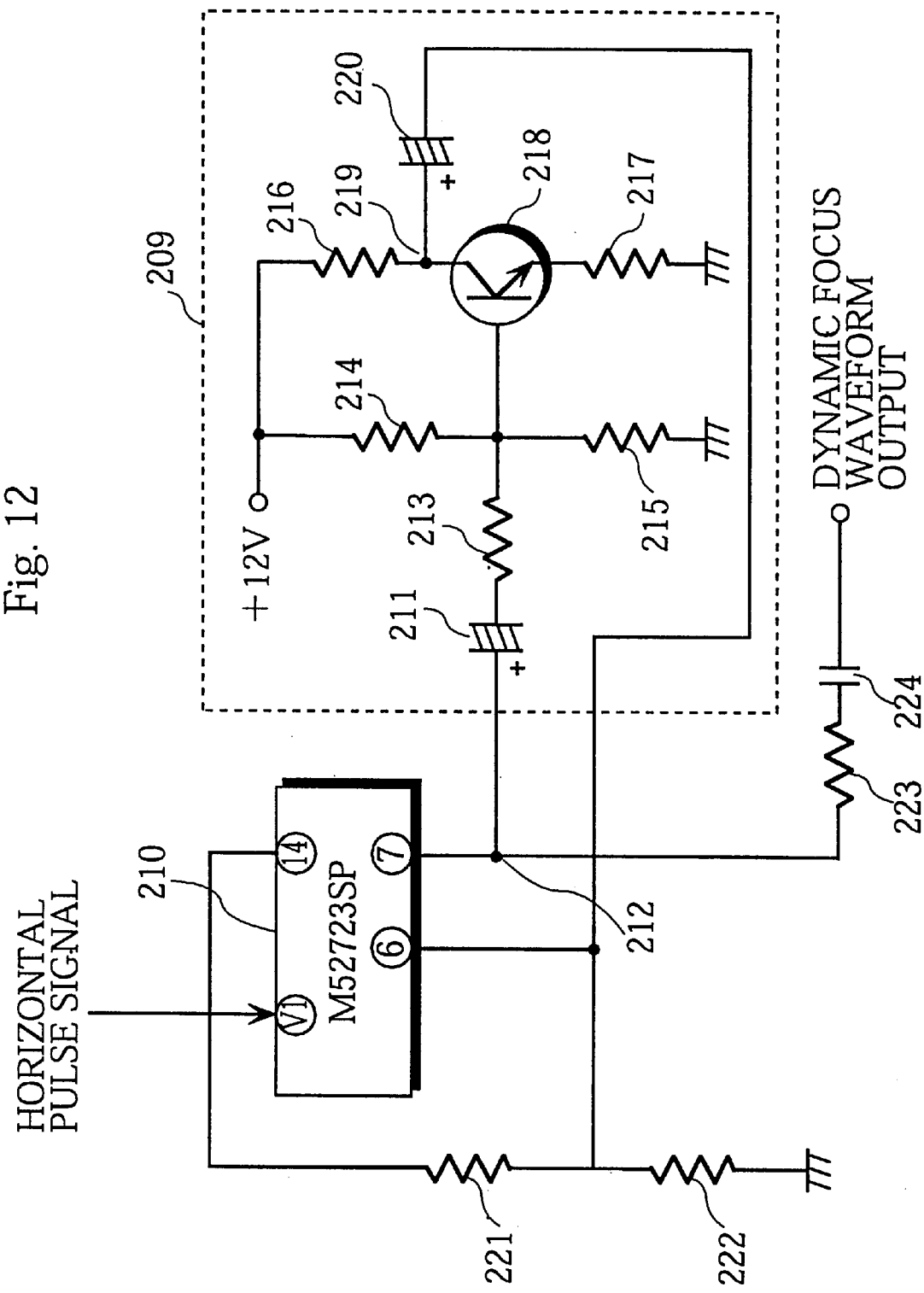
FIG. 12 shows an embodiment in which the dynamic focus circuit of the second embodiment, having a structure as shown in FIG. 10, is structured using a DAF signal generating circuit manufactured by Mitsubishi Electric Corp.

The following is an explanation of an actual method for realizing the dynamic focus circuit of the present embodiment, using a commercial DAF signal generating IC. FIG. 12 shows an example structure for the dynamic focus circuit of the present embodiment, structured as shown in FIG. 10, using a DAF signal generating IC manufactured by Mitsubishi Electric Corp. (product number M52723SP).

As stated above, the DAF signal generating IC 210 in the present embodiment includes the parabolic waveform signal generating circuit 201 and the gain control unit 202 shown in FIGS. 9 to 11. The part of the circuit in FIG. 12 that is enclosed by dashed lines corresponds to the inverting amplifier circuit 209 shown in FIG. 10. Pin 7 of the DAF signal generating IC 210 is a terminal for outputting the parabolic waveform signal, and is connected to the output amplifying unit 204 (not shown in FIG. 12) through a resistor 223 and a coupling capacitor 224, as well as being connected to the inverting amplifier circuit 209 via a pathway that branches off from a node 212 to which the resistor 223 is also connected. Pin 14 of the DAF signal generating IC 210 is connected to ground through resistors 221 and 222.

The gain control generating circuit, here the inverting amplifier circuit 209, is composed of a transistor 218 and a plurality of resistors. A coupling capacitor 211 is provided as an input unit. The other terminal of the coupling capacitor 211 is connected to a node, at which resistors 214 and 215 connect, through a resistor 213. The other terminal of the resistor 214 is connected to a 12V power source and the other terminal of the resistor 215 to ground. The base terminal of the transistor 218 is connected to the node to which the resistors 213, 214 and 215 are connected, the emitter terminal is connected to ground through a resistor 217 and the collector terminal is connected to the 12V power source through a resistor 216. A coupling capacitor 220 is connected to the collector terminal, forming an output unit, which is connected to the node at which the resistors 221 and 222 are connected and to pin 6 of the DAF signal generating IC 210.

The following is a detailed explanation of the operation of the dynamic focus circuit in the present embodiment.

Figure 13A:
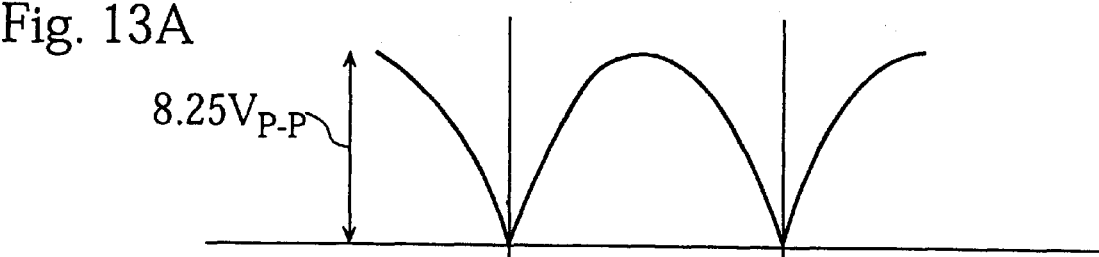
FIG. 13 shows waveforms produced at various parts of the dynamic focus circuit in the second embodiment, having a structure as in FIG. 10.

A horizontal parabolic waveform signal is generated by the parabolic waveform generating circuit 201 (not shown in the drawing) in the DAF signal generating IC 210 using a horizontal pulse signal input into pin 17 of the DAF signal generating IC 210. The parabolic waveform signal is inversed and output from pin 7 of the DAF signal generating IC 210. This is the voltage at point A in FIG. 10. Here, the parabolic waveform signal has a peak voltage of 8.25V (quadratic wave), as shown in FIG. 13A. This parabolic waveform signal is input into the inverting amplifier circuit 209, where it is input into the transistor 218 through the coupling capacitor 211 and the resistor 213. The base terminal of the transistor 218 is biased by the resistors 214 and 215, and a horizontal parabolic waveform signal is amplified according to the ratio of the resistance values of the resistors 216 and 217, inversed and output by the collector terminal of the transistor 218.

Figure 13B:

The parabolic waveform signal output from the collector terminal of the transistor 218 is output through the coupling capacitor 220, so that the output of the inverting amplifier circuit 209 forms the AC component of the parabolic waveform signal. This AC wave, is coupled to a DC voltage of, for example, 3V, obtained by dividing a 7V DC voltage output from pin 14 of the DAF signal generating IC 210 using the resistors 221 and 222. The resulting voltage is fed back to pin 6 of the DAF signal generating IC 210 as the gain control voltage. This voltage occurs at point B in FIG. 10, and the parabolic waveform signal has a peak voltage of approximately 12V, as shown in FIG. 13B. In the method of the present embodiment, the waveform of the parabolic waveform signal is actually changed in the gain control circuit 207, as explained below. This means that neither the output signal of the inverting amplifier circuit 209 nor the gain control voltage is a parabolic wave (quadratic wave).

Figure 14:
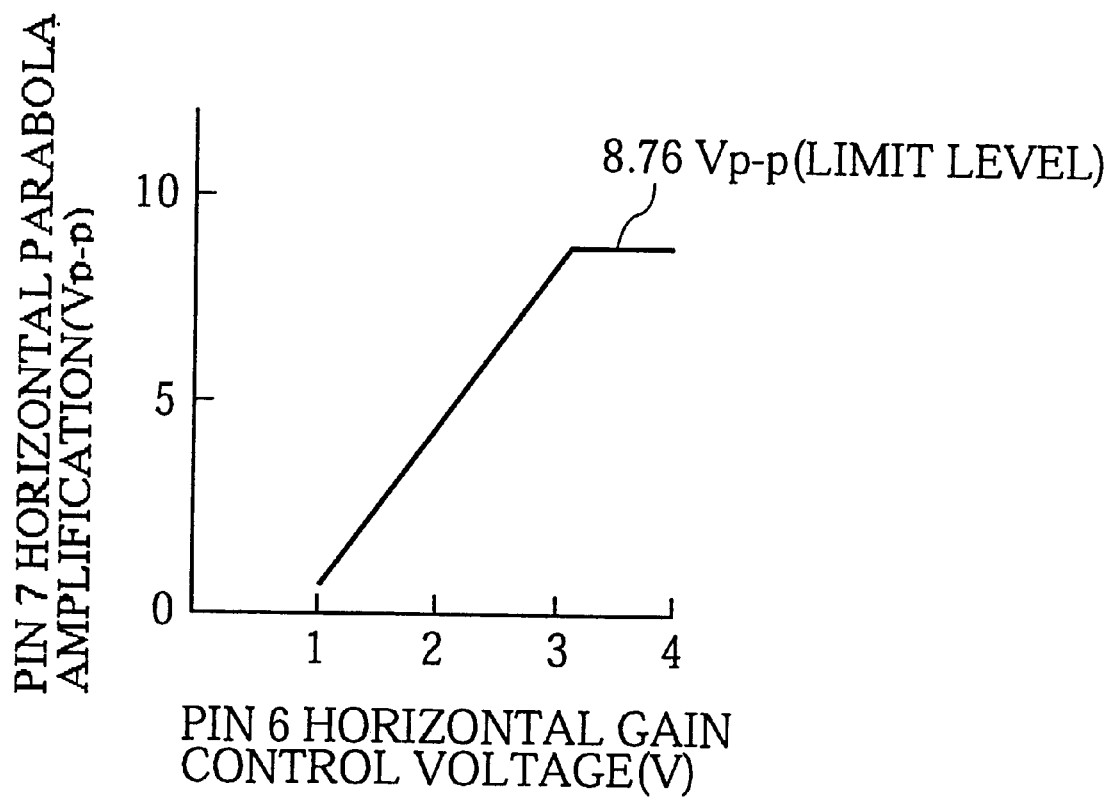
FIG. 14 shows the relationship between the gain control voltage input into pin 6 and the amplitude of the parabolic waveform signal output from pin 7 in the DAF signal generating IC 210 used as an embodiment of the dynamic focus circuit in the second embodiment.

Pin 6 of the DAF signal generating IC 210 is the input pin for the gain control voltage, that is the voltage input pin controlling the amplitude of the horizontal parabolic wave. FIG. 14 shows the relation between the gain control voltage input into pin 6 of the DAF signal generating IC 210 used in the present embodiment, and the amplitude of the parabolic waveform signal output from pin 7 of the DAF signal generating IC 210. In the DAF signal generating IC 210 of the present embodiment, a DC voltage in the range of 1.0V to 4.0V may be input, as shown in the drawing. Amplitude is controlled so that it increases as the gain control voltage rises, provided that the limit level of 8.76Vp-p is not exceeded.

Figure 13C:
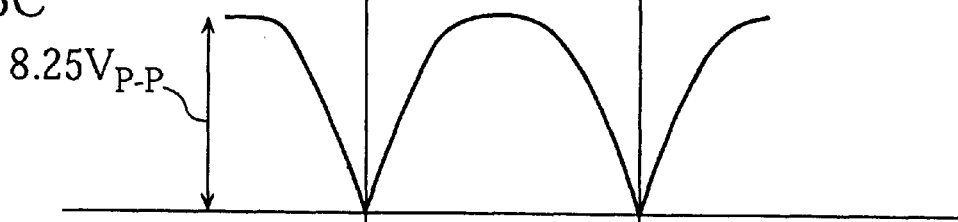
Figure 13D:
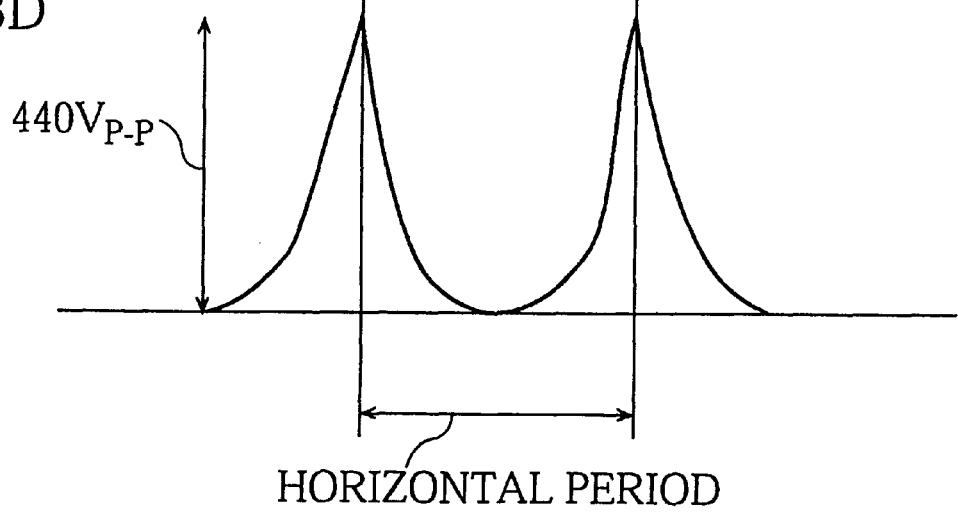

In the method of the present embodiment, the gain control voltage input into pin 6 of the DAF signal generating IC 210 is modulated by its AC component, so that the gain applied to the parabolic waveform signal passing through the gain control circuit 207 is continuously changed. This means that gain is controlled so that it changes as the electron beam is scanned horizontally across the screen from the center to the edges, increasing amplitude. Accordingly, the voltage output from pin 7 of the DAF signal generating IC 210 is controlled so that amplitude gain in the center of the screen is small and amplitude gain at the edges of the screen is large. The voltage is thus shaped so that it is constant in the center of the screen and rises steeply at the edges of the screen. This voltage occurs at point C in FIG. 10, and forms a flat-bottomed waveform with a peak voltage of approximately 8.25V, as shown in FIG. 13C. The voltage is amplified by the output amplifying unit 204, becoming the voltage occurring at point D in FIG. 10, in other words a dynamic focus voltage with a peak voltage of approximately 440V, as shown in FIG. 13D.

By performing the above operations, a dynamic focus voltage having a flat-bottomed waveform identical to the one in the first embodiment illustrated in FIG. 8 is output by the dynamic focus circuit in the present embodiment. This means that the dynamic focus voltage in this embodiment is a curve proportional to the distance from the center of the screen raised to a power of around 2.5 for the right half of the screen, with the left half of the screen being a mirror image of the curve for the right half of the screen.

As explained previously, in the dynamic focus circuit of the present embodiment, the dynamic focus voltage required to obtain an ideal focus across the entire screen of a wide-angled CRT device can be produced by the addition of a simple and low-cost circuit to the analog circuit in the related art. This means that a simple circuit composed of transistors and resistors need only be added to a related art dynamic focus circuit that uses an existing general-purpose DAF signal generating IC to enable a circuit capable of generating only related art parabolic waves to generate waveforms expressed by a complex function.

In the present embodiment, the DAF signal generating IC used was one manufactured by Mitsubishi Electric Corp., but any IC with similar capabilities may be used.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A dynamic focus circuit that obtains a dynamic focus signal from a parabolic waveform signal generated at both ends of an S-shaping capacitor, the dynamic focus signal being supplied to an electron gun in a cathode ray tube to focus an electron beam, and the parabolic waveform signal having a horizontal deflection period, the dynamic focus circuit comprising:

a transformer, having a primary coil and a secondary coil, the parabolic waveform signal being applied to the primary coil;

a first converting means for converting a signal induced in the secondary coil of the transformer to a dynamic focus signal at a gain of less than one during a first part of a horizontal deflection period, the first part of the horizontal deflection period being when the voltage of the signal induced in the secondary coil does not exceed a specified reference value; and a second converting means for converting the signal induced in the secondary coil of the transformer to a dynamic focus signal at a gain greater than the gain of the first converting means during a remainder of the horizontal deflection period, the remainder of the horizontal deflection period being when the voltage of the signal induced in the secondary coil is not less than the specified reference value.

2. The dynamic focus circuit of claim 1, wherein:

the first converting means includes a first switching component that is ON when the voltage of the signal induced in the secondary coil does not exceed the specified reference value, the second converting means includes a second switching component that is ON when the voltage of the signal induced in the secondary coil is not less than the specified reference value;

wherein at least one impedance component is connected in series to the first switching component, and at least one impedance component is connected in parallel to the second switching component.

3. The dynamic focus circuit of claim 2, wherein:

an input side of the first switching component is connected to one terminal of the secondary coil;

an input side of the second switching component is connected to the other terminal of the secondary coil; and an output side of the first switching component and an output side of the second switching component are connected to a path leading to an output point for the dynamic focus signal.

4. The dynamic focus circuit of claim 2, wherein the first converting means converts the signal induced in the secondary coil into the dynamic focus signal according to a voltage division ratio of the impedance components.

5. The dynamic focus circuit of claim 2, wherein the first and second switching components are rectifier diodes, and the impedance components are resistors.

6. The dynamic focus circuit of claim 1, wherein the specified reference value is an average value of the voltage of the signal induced in the secondary coil of the transformer.

7. A dynamic focus circuit that obtains a dynamic focus signal from a parabolic waveform signal generated at both ends of an S-shaping capacitor in a horizontal deflection circuit, the dynamic focus signal being supplied to an electron gun in a cathode ray tube to focus an electron beam, the dynamic focus circuit comprising:

a transformer, having a primary coil and a secondary coil, the parabolic waveform signal being applied to the primary coil;

a first switching component, connected to one terminal of the secondary coil of the transformer, the first switching component being ON when the voltage of a signal induced in the secondary coil is not less than an average value of the voltage of the signal induced in the secondary coil, and OFF when the voltage of the signal induced in the secondary coil does not exceed an average value of the voltage of the signal induced in the secondary coil;

a second switching component, connected to the other terminal of the secondary coil of the transformer, the second switching component being OFF when the voltage of the signal induced in the secondary coil is not less than the average value of the signal induced in the secondary coil, and ON when the voltage of the signal induced in the secondary coil does not exceed the average value of the voltage of the signal induced in the secondary coil; and a plurality of impedance components, arranged between both ends of the secondary coil and the output point for the dynamic focus signal, each of the plurality of impedance components being connected in at least one of series and parallel to the first and second switching components, a first gain circuit being formed by the plurality of impedance components when the first switching component is ON, and a second gain circuit being formed by the plurality of impedance components when the second switching component is ON, gain of the first gain circuit being greater than gain of the second gain circuit, and the gain of the second gain circuit being less than one, wherein, when the second switching component is ON, the voltage of the signal induced in the secondary coil is output to the output point at a gain of less than one and, when the first switching component is ON, the voltage of the signal induced in the secondary coil is output to the output point at a gain greater than the gain when the second switching component is ON.

8. The dynamic focus circuit of claim 7, wherein:

the first and second switching components are rectifier diodes, and cathode sides of each switching component are connected to each other and to the path leading to the output point for the dynamic focus signal; and the impedance components are resistors.

9. The dynamic focus circuit of claim 8, wherein:

at least one impedance component is connected in parallel to the first switching component and at least one impedance component is connected in series to the first switching component; and at least one impedance component is connected in series to the second switching component.

10. A dynamic focus circuit that obtains a dynamic focus signal from a pulse signal having a horizontal deflection period, the dynamic focus signal being supplied to an electron gun in a cathode ray tube to focus an electron beam, the dynamic focus circuit comprising:

a parabolic waveform generating integrated circuit (IC), including a first circuit part that generates a parabolic waveform signal having a horizontal deflection period from the pulse signal, and a second circuit part that amplifies the parabolic waveform signal, the parabolic waveform generating IC being provided with a receiving part that receives a control voltage for controlling a gain of the second circuit part; and a control voltage generating circuit for outputting the control voltage to the receiving part, the control voltage changing the gain so that the gain is less than one in a central part of the horizontal deflection period, and not less than one in the parts of the horizontal deflection period excluding the central part.

11. The dynamic focus circuit of claim 10, wherein the control voltage generating circuit generates a rectangular signal expressing a control voltage so that the gain is less than one in a central part of the horizontal deflection period, and not less than one in the parts of the horizontal deflection period excluding the central part.

12. The dynamic focus circuit of claim 10, wherein the control voltage generating circuit is a function generating circuit outputting an analog signal, based on the pulse signal for the horizontal deflection period, the analog signal expressing a control voltage that changes smoothly so that the gain is less than one in a central part of the horizontal deflection period, and not less than one in the parts of the horizontal deflection period excluding the central part.

13. The dynamic focus circuit of claim 10, wherein the control voltage generating circuit is a feedback circuit that inputs a signal output by the parabolic waveform signal generating IC into the receiving part.

14. The dynamic focus circuit of claim 13, wherein the feedback circuit includes an inverting amplifier circuit that inverts the polarity of the signal output by the parabolic waveform signal generating IC.

* * * * *